(12) United States Patent
Xia

(10) Patent No.: US 7,913,412 B2
(45) Date of Patent: Mar. 29, 2011

(54) CONTOUR MEASURING PROBE

(75) Inventor: Fa-Ping Xia, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/648,474

(22) Filed: Dec. 29, 2009

(65) Prior Publication Data

US 2010/0212174 A1 Aug. 26, 2010

(30) Foreign Application Priority Data

Feb. 25, 2009 (CN) .......................... 2009 1 0300541

(51) Int. Cl.
*G01B 5/20* (2006.01)
(52) U.S. Cl. .......................................... 33/559; 33/551

(58) Field of Classification Search .................... 33/546, 33/551, 552, 553, 554, 559
See application file for complete search history.

(56) References Cited

U.S. PATENT DOCUMENTS

| 7,065,893 | B2 * | 6/2006 | Kassai et al. ..................... 33/554 |
| 7,398,603 | B2 * | 7/2008 | Liu et al. .......................... 33/559 |
| 7,594,338 | B2 * | 9/2009 | Kong et al. ....................... 33/556 |
| 7,650,701 | B2 * | 1/2010 | Liu et al. .......................... 33/556 |
| 7,681,323 | B2 * | 3/2010 | Liu et al. .......................... 33/559 |
| 2005/0229419 | A1 * | 10/2005 | Dall'Aglio et al. ............. 33/551 |
| 2009/0007449 | A1 * | 1/2009 | Liu et al. .......................... 33/556 |
| 2009/0094849 | A1 * | 4/2009 | Kong et al. ....................... 33/556 |
| 2010/0101105 | A1 * | 4/2010 | Hon et al. ........................ 33/559 |

* cited by examiner

*Primary Examiner* — G. Bradley Bennett
(74) *Attorney, Agent, or Firm* — Clifford O. Chi

(57) ABSTRACT

A contour measuring probe includes an air guide, a sliding member and a probe tip. The air guide defines a guide hole. The sliding member is slidably received in the guide hole. The probe tip is fixed on an end of the sliding member. A cross-section of the sliding member is non-circular, and the guide hole is a non-circular hole, such that the sliding member slides only along an axis of the air guide.

20 Claims, 4 Drawing Sheets

CONTOUR MEASURING PROBE

BACKGROUND

1. Technical Field

The present disclosure relates generally to contour measuring probes and, more particularly, to a contour measuring probe with an air guide.

2. Description of Related Art

Manufactured precision objects such as optical components (for example, aspherical lenses) and various industrial components need to be measured to determine whether manufacturing errors of the objects are within acceptable tolerance ranges. Such manufacturing errors are differences between the designed dimensions of the object and the actual dimensions of the object as manufactured. Measured dimensions of the manufactured object are usually regarded as the actual dimensions. A high-precision measuring device, such as a contour measuring probe, is used to measure the objects, with maximum precision being preferred. The contour measuring probe requires applying a predetermined measuring force on measured objects. The contour measuring probe generally includes an air guide having a tube track and a cylindrical sliding tube. The tube track defines a circular through hole for slidably receiving the hollow tube. The sliding tube is capable of floating in the tube track, thus reducing a friction force between the sliding tube and the tube track. However, the cylindrical sliding tube can also rotate in the through hole, such that a measurement precision decreases.

Another contour measuring probe generally includes a base, a linear measuring scale, a displacement sensor, a probe tip, an air guide, and two fixing plates. The linear measuring scale and the air guide are fixed on the base. The air guide includes a tube track and two cylindrical hollow tubes. The tube track defines two circular through holes side by side, in which the hollow tubes are slidably received. A gap between each hollow tube and the tube track can be filled with air, such that the hollow tubes slide in the tube track smoothly. The fixing plates connect the hollow tubes respectively at opposite sides of the tube track. The hollow tubes are parallel to each other. The probe tip is fixed to one fixing plate, and the displacement sensor is fixed to the other fixing plate.

Being fixed together by the fixing plates, the hollow tubes cannot rotate in the tube track. Therefore, the contour measuring probe has higher measurement precision. However, such contour measuring probe must provide two hollow tubes, requiring considerable size and manufacturing cost.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
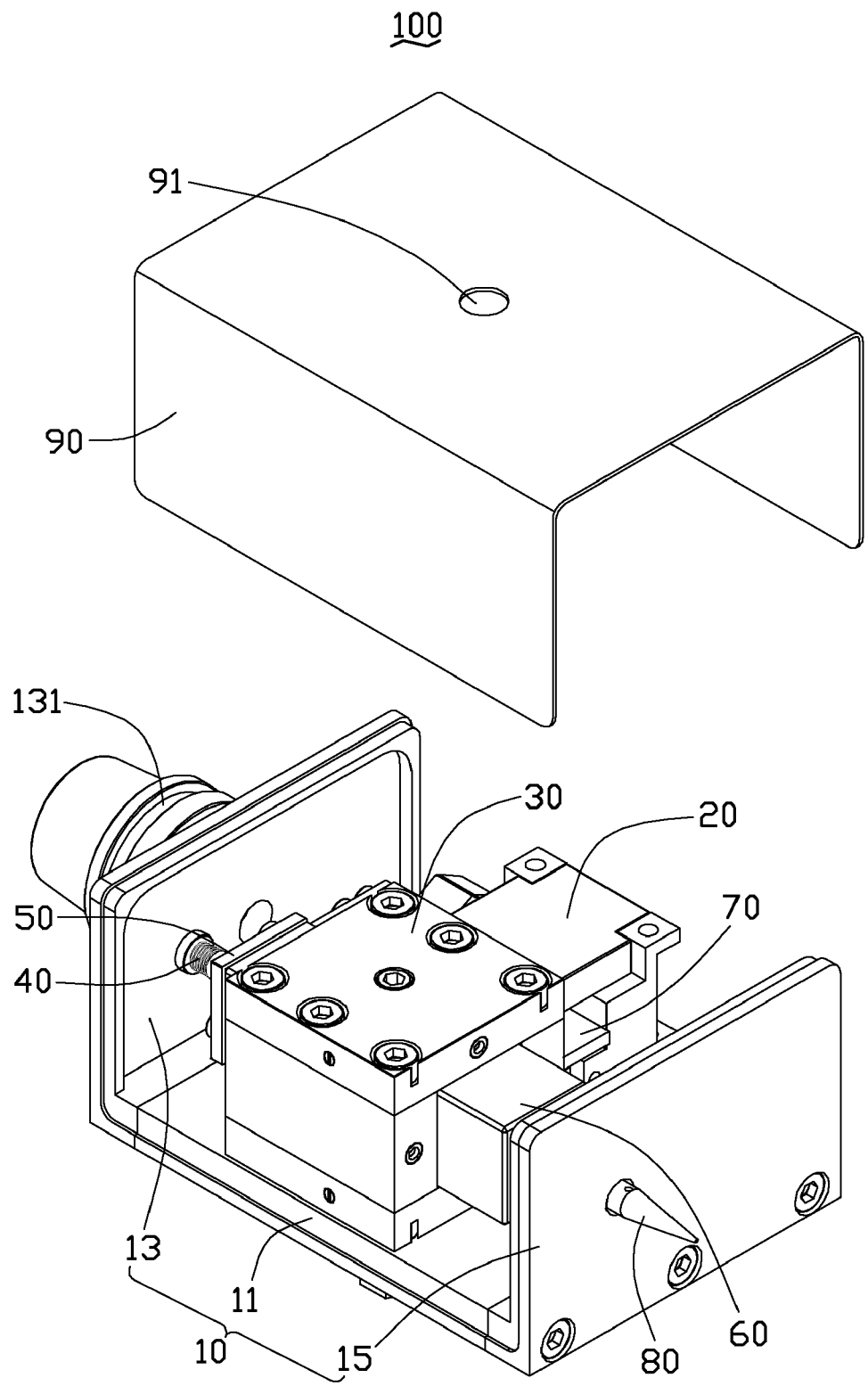
FIG. 1 is an exploded, isometric view of an embodiment of a contour measuring probe including a base, a displacement sensor, an air guide, a resisting member, a connecting member, a sliding member, a linear measuring scale, a probe tip, and a housing.

Referring to FIG. 1, an embodiment of a contour measuring probe 100 includes a base 10, a displacement sensor 20, an air guide 30, a resisting member 40, a connecting member 50, a sliding member 60, a linear measuring scale 70, a probe tip 80, and a housing 90.

Figure 2:
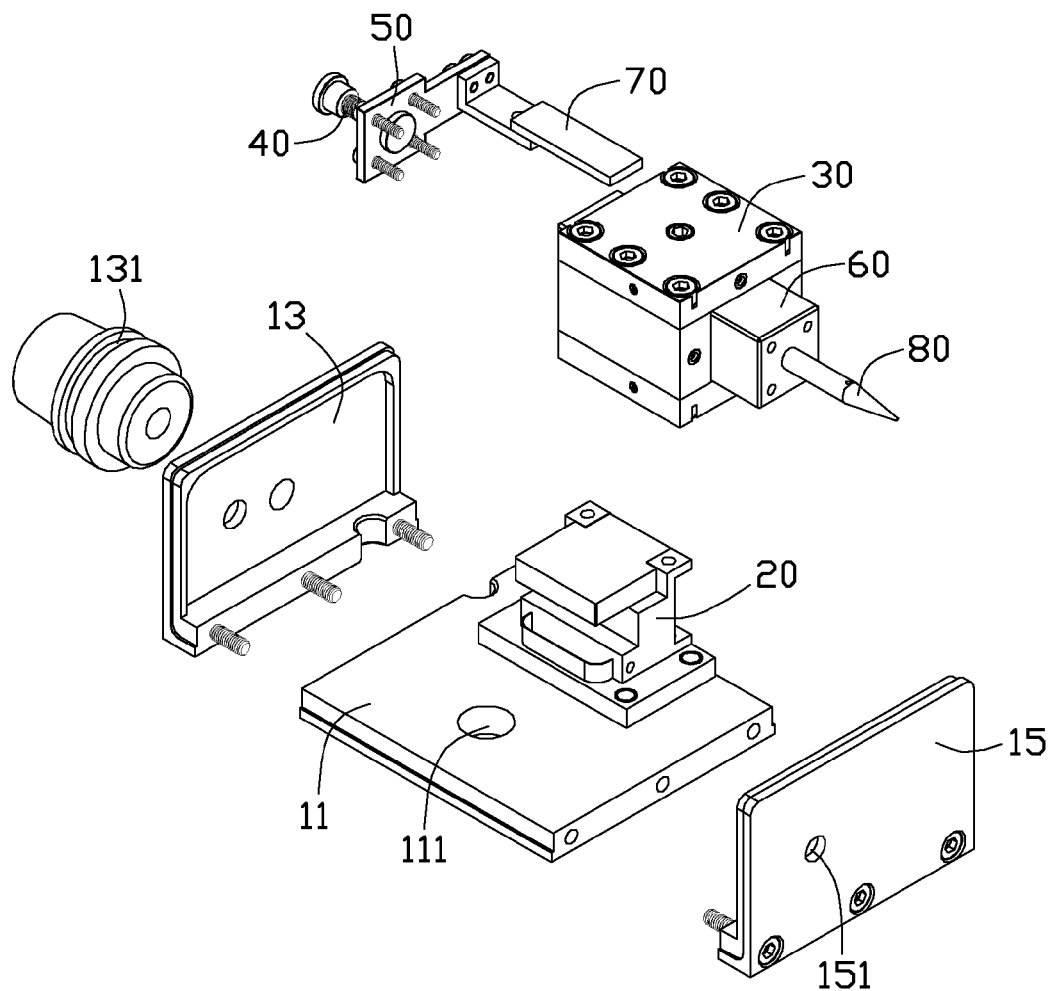
FIG. 2 is an exploded, isometric view of the contour measuring probe of FIG. 1 omitting the housing.

Referring to FIG. 2, the base 10 includes a base plate 11, a first sidewall 13 and a second sidewall 15. The first sidewall 13 and the second sidewall 15 are perpendicularly positioned on opposite sides of the base plate 11. The base plate 11 defines a connecting hole 111. A connecting portion 131 is fixed on the first sidewall 13, configured for connecting with a machine tool (not shown). The second sidewall 15 defines a through hole 151.

The displacement sensor 20 is positioned on the base plate 11, and used for reading displacement values of the linear measuring scale 70.

Figure 4:
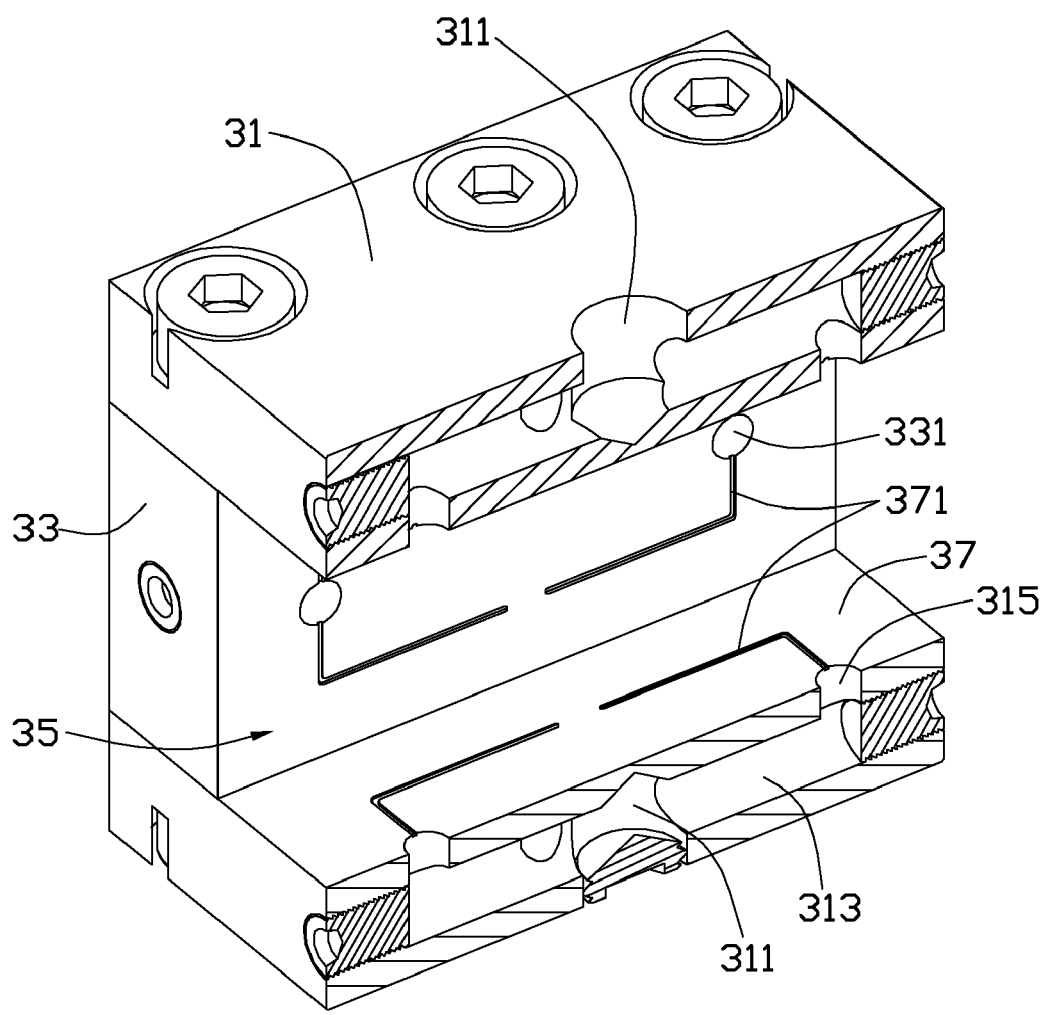
FIG. 4 is a side cross-section of the air guide of FIG. 1.

Referring to FIGS. 1 and 4, the air guide 30 is positioned and fixed on the base plate 11. The air guide 30 and the displacement sensor 20 are arranged side by side. The air guide 30 is substantially rectangular cuboid in shape, and includes two first side plates 31 and two second side plates 33. The first side plates 31 and the second side plates 33 cooperatively define a rectangular guide hole 35, and the air guide 30 has an inner surface 37. The first side plates 31 and the second side plates 33 can be fixed together via welding, gluing or fasteners. In the illustrated embodiment, the first side plates 31 and the second side plates 33 are fixed together via fasteners in the form of hex socket screws (not labeled).

Each first side plate 31 defines an air intake 311 in an outer surface, a plurality of first guide holes 313 therein communicating with the air intake 311, and a plurality of air outlets 315 in an inner surface opposite to the sliding member 60 communicating with the guide holes 313. Each second side plates 33 defines a plurality of second guide holes (not shown) therein communicating with the first guide holes 313 of the first side plates 31, and a plurality of air outlets 331 in an inner surface 37 communicating with the second guide holes. The air guide 30 further defines a plurality of guide grooves 371 in the inner surface 37 opposite to the sliding member 60, which the guide grooves 371 communicates with the air outlets 315 and the air outlets 331.

Figure 3:
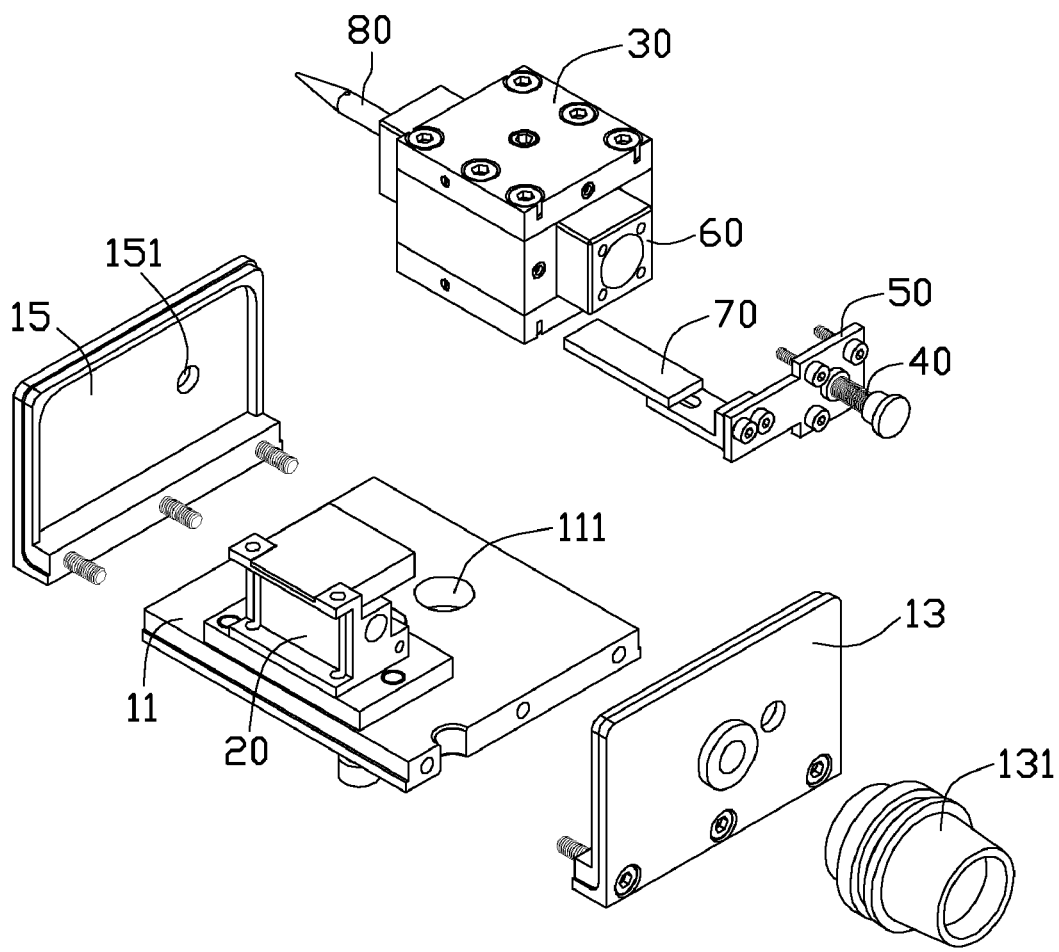
FIG. 3 is similar to FIG. 2, but viewed from another aspect.

Referring to FIGS. 2 and 3, an end of the resisting member 40 is fixed to the first sidewall 13, and the other end of the resisting member 40 is fixed to the connecting member 50. The resisting member 40 is configured for providing variable amounts of force resistance for use during measuring. In the illustrated embodiment, the resisting member 40 is a spring. The connecting member 50 is of a flat board configuration.

The sliding member 60 is of hollow construction, and of non-circular in cross-section. In the illustrated embodiment, a cross-section of the sliding member 60 is square, thereby allowing only lateral travel thereof along the axis of the air guide 30. The sliding member 60 is fixed to the connecting member 50 by means of fasteners such as hex socket screws. The sliding member 60 is slidably received in the guide hole 35 of the air guide 30. The sliding member 60 and the resisting member 40 are respectively disposed at the two sides of the connecting member 50.

The linear measuring scale 70 is fixed on the connecting member 50 by means of fasteners such as hex socket screws. The linear measuring scale 70 is parallel to the sliding member 60, and adjacent to the displacement sensor 20.

The probe tip 80 is fixed on the sliding member 60, and extends through the through hole 151 of the second sidewall 15.

Referring to FIG. 1, the housing 90 is attached to the base 10, preventing contaminants from entering therein. The housing 90 defines an assembly hole 91.

Referring to FIGS. 1 through 4, one air intake 311 of the air guide 30 corresponds to and communicates with the assembly hole 91 of the housing 90, and the other air intake 311 corresponds to the connecting hole 111 of the base 10. Compressed air can be introduced into the air guide 30 via one or both of the intakes 311. The compressed air flows through the first guide holes 313 and the second guide holes, and is drawn into the guide hole 35 via the air outlets 315, 331 and the guide grooves 371. Therefore, the sliding member 60 is then levitating in the air guide 30 during a measuring process, and can move with little frictional resistance along the axis thereof.

Since the cross-section of the sliding member 60 is square, and the guide hole 35 is rectangular, the sliding member 60 can move linearly relative to the air guide 30 along the axis of the air guide 30, but cannot rotate or move laterally relative to the air guide 30. Accordingly, only one sliding member 60 is needed to achieve high-precision measurement, rather than two or more. The distance between the sliding member 60 and the linear measuring scale 70 is thereby also minimized for improving upon accuracy and length requirement for the contour measuring probe 100. The contour measuring probe 100 presents minimized size and costs. In addition, side-by-side arrangement of the air guide 30 and the displacement sensor 20 reduces the overall length necessary for the contour measuring probe 100.

It should be pointed out that the cross-section of the sliding member 60 perpendicular to the axis thereof may be of other non-circular shapes, such as triangular. The shape of the guide hole 35 need not correspond exactly to that of the sliding member 60, provided the sliding member 60 is kept from rotating in the guide hole 35 of the air guide 30. For example, the cross-section of the sliding member 60 perpendicular to the axis thereof can be rectangular, and the guide hole 35 can be triangular. In addition, the displacement sensor 20 may be fixed to the connecting member 50, whereby the linear measuring scale 70 is positioned on the base 10 adjacent to the displacement sensor 20.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A contour measuring probe, comprising:
   an air guide defining a guide hole;
   a sliding member slidably received in the guide hole; and
   a probe tip fixed on an end of the sliding member;
   wherein a cross-section of the sliding member perpendicular to the axis thereof is non-circular, and the guide hole is a non-circular hole.

2. The contour measuring probe of claim 1, further comprising a linear measuring scale and a displacement sensor, one of which connects to and moves cooperatively with the slide member.

3. The contour measuring probe of claim 2, further comprising a connecting member connecting the linear measuring scale to the sliding member, the linear measuring scale parallel to the sliding member and adjacent to the displacement sensor.

4. The contour measuring probe of claim 3, further comprising a base comprising a base plate, a first sidewall and a second sidewall, wherein the first sidewall and the second sidewall are positioned on opposite sides of the base plate; and the air guide is fixed on the base plate.

5. The contour measuring probe of claim 4, further comprising a resisting member connecting the first sidewall to the connecting member.

6. The contour measuring probe of claim 5, wherein the resisting member is a spring.

7. The contour measuring probe of claim 1, wherein the sliding member is of a hollow construction.

8. The contour measuring probe of claim 1, wherein the air guide comprises two first side plates and two second side plates cooperatively defining the guide hole, wherein the guide hole is rectangular, and the sliding member is square in cross-section.

9. The contour measuring probe of claim 1, wherein the air guide defines at least one air intake in an outer surface, a plurality of air outlets in an inner surface opposite to the sliding member, and a plurality of first guide holes therein communicating the at least one air intake with the air outlets.

10. The contour measuring probe of claim 9, wherein the air guide further defines a plurality of guide grooves in the inner surface opposite to the sliding member, and the guide groove communicates with the air outlets.

11. A contour measuring probe, comprising:
    an air guide defining a guide hole;
    a sliding member slidably received in the guide hole; and
    a probe tip fixed on an end of the sliding member;
    wherein the sliding member comprises a plurality of flat surfaces on the sides connecting in turn, and the air guide comprises a plurality of side plates connecting in turn, each side plate opposite to one corresponding flat surface on the side, such that the sliding member is prevented from rotating relative to the air guide.

12. The contour measuring probe of claim 11, further comprising a linear measuring scale and a displacement sensor, one which connects to and moves with the slide member.

13. The contour measuring probe of claim 12, further comprising a connecting member, connecting the linear measuring scale to the sliding member, wherein the linear measuring scale is parallel to the sliding member and adjacent to the displacement sensor.

14. The contour measuring probe of claim 13, further comprising a base, comprising a base plate, a first sidewall and a second sidewall, wherein the first sidewall and the second sidewall are positioned on opposite sides of the base plate and the air guide is fixed on the base plate.

15. The contour measuring probe of claim 14, further comprising a resisting member, which connects the first sidewall to the connecting member.

16. The contour measuring probe of claim 15, wherein the resisting member is a spring.

17. The contour measuring probe of claim 11, wherein the sliding member is of a hollow construction.

18. The contour measuring probe of claim 11, wherein the air guide comprises two first side plates and two second side plates; the first side plates and the second side plates cooperatively defining a rectangular guide hole, and a cross-section of the sliding member perpendicular to the axis thereof is square.

19. The contour measuring probe of claim 11, wherein the air guide defines at least one air intake in an outer surface, a plurality of air outlets in an inner surface opposite to the sliding member, and a plurality of first guide holes therein communicating the at least one air intake with the air outlets.

20. The contour measuring probe of claim 19, wherein the air guide further defines a plurality of guide grooves in the inner surface opposite to the sliding member, and the guide groove communicates with the air outlets.

* * * * *